(12) United States Patent
Lörken

(10) Patent No.: US 6,969,335 B2
(45) Date of Patent: Nov. 29, 2005

(54) AUTOMATED GEAR TRANSMISSION

(75) Inventor: Markus Lörken, Wuppertal (DE)

(73) Assignee: Getrag Ford Transmissions GmbH, Cologne (DE)

( * ) Notice: Subject to any disclaimer, the term of this patent is extended or adjusted under 35 U.S.C. 154(b) by 77 days.

(21) Appl. No.: 10/806,568

(22) Filed: Mar. 23, 2004

(65) Prior Publication Data

US 2004/0209728 A1 Oct. 21, 2004

(30) Foreign Application Priority Data

Apr. 17, 2003 (EP) .................... 03101067

(51) Int. Cl.[7] ............... F16H 3/44; F16H 3/08
(52) U.S. Cl. ............ 475/302; 475/343; 74/331
(58) Field of Search ............... 475/207, 214, 475/302, 303, 323–325, 343; 74/331

(56) References Cited

U.S. PATENT DOCUMENTS

| | | | | |
|---|---|---|---|---|
| 3,589,483 A | * | 6/1971 | Smith | 192/3.52 |
| 4,089,237 A | * | 5/1978 | Scholz | 475/218 |
| 4,416,168 A | * | 11/1983 | Arai et al. | 475/142 |
| 4,685,343 A | * | 8/1987 | Ehrlinger et al. | 74/331 |
| 4,727,764 A | * | 3/1988 | Klaue | 74/331 |
| 5,591,097 A | * | 1/1997 | Petri et al. | 475/207 |
| 5,823,051 A | * | 10/1998 | Hall, III | 74/325 |

FOREIGN PATENT DOCUMENTS

| | | | | |
|---|---|---|---|---|
| DE | 3739898 A1 | * | 6/1989 | .......... B60K 17/08 |
| DE | 199 44 879 | | 3/2001 | |
| DE | 19944879 | | 3/2001 | |
| DE | 010037134 A1 | * | 6/2002 | .......... F16H 63/50 |
| JP | 02225844 | | 9/1990 | |
| JP | 03117750 | | 5/1991 | |
| JP | 2000046127 | | 2/2000 | |

* cited by examiner

Primary Examiner—Tisha Lewis
(74) Attorney, Agent, or Firm—MacMillan, Sobanski & Todd, LLC

(57) ABSTRACT

A multiple speed transmission includes first and second concentric input shafts, an output shaft, an auxiliary shaft, a first clutch for driveably connecting and disconnecting the first input shaft, and a second clutch for driveably connecting and disconnecting the second input shaft. First pairs of mutually engaged gears include a first member supported on the first input shaft, and a second member supported on the output shaft. Second pairs of mutually engaged gears includes a first member supported on the second input shaft, and second member supported on the output shaft. A gear wheel, supported on the auxiliary shaft, engages a gear of a second pair on the second input shaft. A planetary gearset includes a ring gear driveably engaged with a member of the first pair on the first input shaft. The carrier of the gearset is held against rotation in reverse drive and released in forward drive.

18 Claims, 4 Drawing Sheets

AUTOMATED GEAR TRANSMISSION

BACKGROUND OF THE INVENTION

The invention relates to an automated gear transmission, more particularly to a dual-clutch transmission having two input shafts arranged mutually essentially concentrically for use in a motor vehicle.

Various automated gear transmissions, dual-clutch transmissions for motor vehicles, are known from the prior art. Of these, numerous embodiments include two concentric input shafts and two output shafts for driving the vehicle. It is also known from DE 199 44 879 A1, that an embodiment with two input shafts arranged essentially concentrically to each other may be provided with only one output shaft for mechanical design simplification and to reduce the transmission's installation space requirement. Disclosed in that publication is a dual-clutch transmission intended for a motor vehicle and comprising two mutually concentric input shafts and one output shaft, with the first and second input shafts being each connectable to a drive shaft via first and second clutches, respectively. The first input shaft is engageable with the output shaft via at least one first pair of gear wheels, whereas the second input shaft is engageable with the output shaft via at least one second pair of gear wheels. In order to achieve an advantageously compact design for front longitudinal mounting in the engine compartment of a motor vehicle, it is intended that the first input shaft should be in the form of a solid shaft while said second input shaft should be of hollow shaft design. The first input shaft should be arranged within the second input shaft. The input shafts and output shaft should each be disposed in a direction essentially parallel to the longitudinal axis of the vehicle, while the first and second clutch should be arranged radially relative to each other.

One embodiment of this arrangement comprises seven forward speeds. Preferably, a separate auxiliary shaft is provided for implementing a reverse gear. According to further design features, the first input shaft carries the respective gear wheels for the seventh, fifth, third and first speeds, in that order, while the second input shaft may carry the respective gear wheels for the second, fourth and sixth speed, in that order. Provision is made in this arrangement for the first and third speed, fourth and sixth speed, fifth and seventh speed, and second and reverse speed to share a common sliding sleeve in each case for selective shifting of the above-mentioned speeds. This feature is intended to achieve a particularly compact design of the dual-clutch transmission. The two clutches may be in the form of multi-plate clutches, whereby a compact radial clutch with a clutch housing is said to be implemented. Depending on how the clutches are configured in this arrangement, the radially inward or radially outward clutch may be designed as a start-up clutch.

A dual-clutch transmission of the above design is alleged to lend itself to compact installation in a front longitudinal configuration in the engine compartment of a motor vehicle, given that the first input shaft is a solid shaft while the second input shaft is in the form of a hollow shaft, one being arranged within the other. Moreover, there is said to be provided only one output shaft extending, like the input shafts, in the longitudinal direction of the vehicle. It is stated to be a decisive feature that the necessary clutches are arranged radially and no longer sequentially relative to each other, whereby the requisite installation space in the vehicle's longitudinal direction is said to be minimized.

A particular disadvantage of this known embodiment of a dual-clutch transmission for a motor vehicle is that the design integration of the reverse speed into said transmission should be improved. Overlap of the individual speed-change gears will regularly occur due to the defined gear positions associated with the integration of the reverse speed. As a result of these defined gear positions in a dual-shaft powershift transmission, a normal reverse speed—as implemented via an axially displaceable sliding gear wheel—cannot be achieved without overlap, or a poor transmission ratio of the individual speed-change gears, or without negatively affecting the transmission dimensions.

SUMMARY OF THE INVENTION

The transmission of this invention integrates the reverse speed such that all overlap of the individual speed-change gears is eliminated. The transmission meets or improves requirements regarding the transmission ratio of the individual change-speed gears and the use of packaging space. In addition, the transmission improves service durability and reliability, and is simple and inexpensive to manufacture.

The transmission includes two concentric input shafts, a solid shaft surrounded by a hallow, sleeve shaft. Various meshing gear pairs on the input shafts and the output shaft produce the forward speeds. For reverse drive, torque is transmitted from an input shaft by a member of one of these gear pairs to an auxiliary shaft, where reverse speed is produced by a planetary gear set supported on the auxiliary shaft. The ring gear of the planetary gear set has gear teeth that are engaged with another member of one of those gear pairs. In this way, reverse speed torque is transmitted from the ring gear through one of these gear pairs to the output shaft, with one of the gears acting as an idler. This arrangement saves space and reverses the rotational direction of the output, as required for reverse drive. To perform this dual function, the ring gear has both external and internal teeth.

The gear wheel mounted on the second input shaft that transmits torque to the auxiliary shaft is the gear wheel for the fourth speed or sixth speed. Thus, torque for driving the vehicle in reverse is transmitted from an input shaft in a simple manner via the fourth or sixth speed gear to the reverse-speed gear wheel on the auxiliary shaft.

The gear wheel, mounted on the first input shaft that is engaged with the ring gear of the planetary gear set for torque transmission to the output shaft, is a third speed gear or a fifth speed gear. Thus, torque is transmitted to the output shaft via the ring gear and the third or fifth speed gear. In this condition, with the clutch disengaged, the third or fifth speed gear on the first input shaft becomes an idler gear serving to transmit torque for the reverse speed. For this to take place, third or fifth gear must be engaged, respectively, so that the torque can be transmitted to the output shaft.

Another advantage of the transmission is the synchronized process of bringing the planet carrier of the planetary gear set into form-fitting, non-slip engagement with the housing to produce reverse drive.

An additional space saving feature is the use of a common sliding selector sleeve on respective couplers or synchronizes to produce the first and fifth speeds, an other sleeve for the third and sixth speeds, and another sleeve for the fourth and second speeds.

A multiple speed transmission according to this invention that accomplishes these advantages includes first and second concentric input shafts, an output shaft, an auxiliary shaft, a first clutch for driveably connecting and disconnecting the first input shaft, and a second clutch for driveably connecting and disconnecting the second input shaft. First pairs of mutually engaged gears include a first member supported on the first input shaft, and a second member supported on the output shaft. Second pairs of mutually engaged gears includes a first member supported on the second input shaft, and second member supported on the output shaft. A gear wheel supported on the auxiliary shaft engages a gear of a second pair on the second input shaft. A planetary gearset includes a ring gear driveably engaged with a member of the first pair on the first input shaft. The carrier of the gearset is held against rotation in reverse drive and released in forward drive.

BRIEF DESCRIPTION OF THE DRAWINGS

These and other advantages of the present invention will become apparent to those skilled in the art from the following detailed description of a preferred embodiment when considered in the light of the accompanying drawings in which.

DETAILED DESCRIPTION OF THE PREFERRED EMBODIMENT

Figure 1:
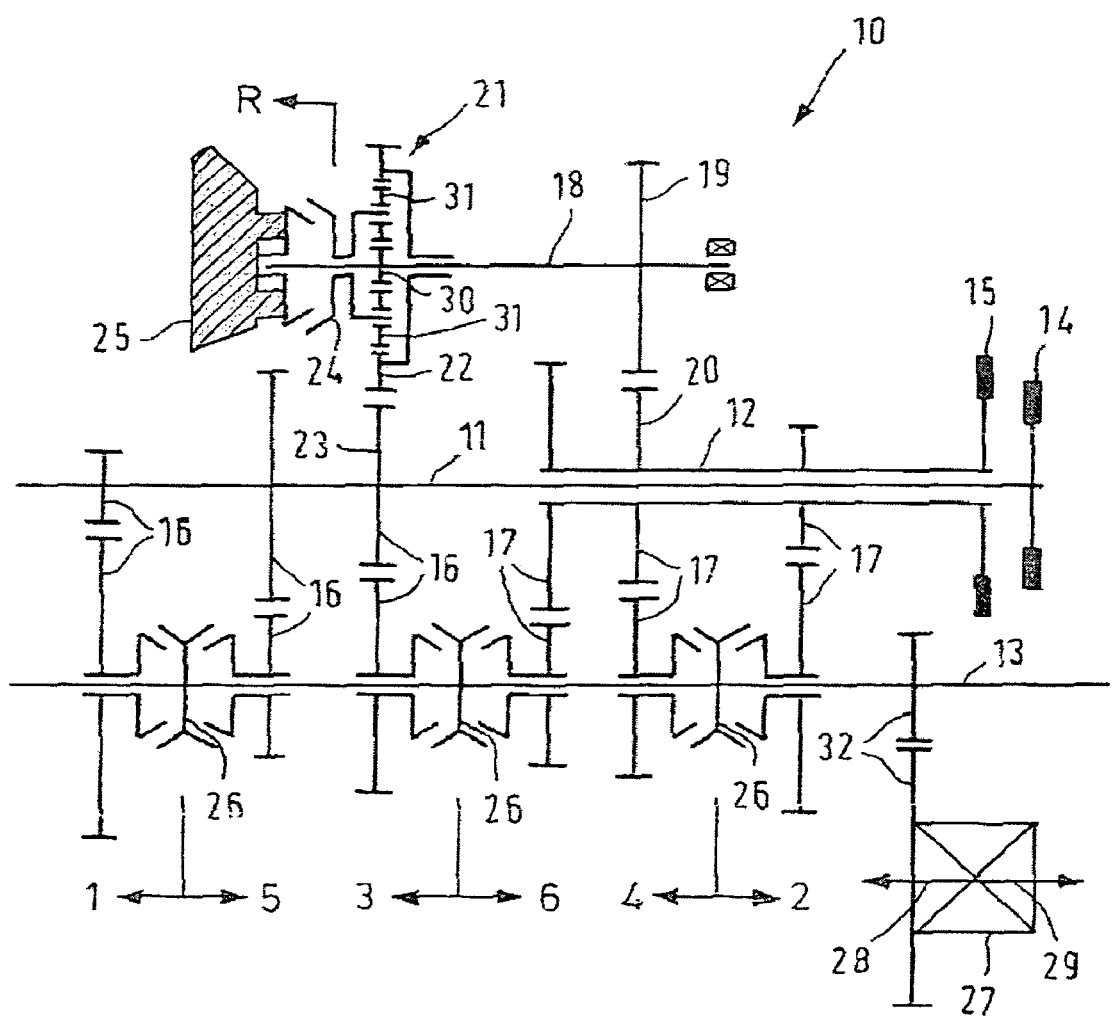
FIG. 1 is a schematic view of an automated gear transmission according to the invention.

Referring now to the drawings, there is illustrated in FIG. 1 an automated gear transmission 10 according to the invention. The transmission 10, designed particularly as a dual-clutch transmission, includes two input shafts 11, 12 arranged essentially mutually concentrically, and an output shaft 13. The first input shaft 11 is a solid shaft. The second input shaft 12 is a hollow shaft. The first input shaft 11 is arranged, over a portion of its longitudinal extent, inside second input shaft 12, as illustrated in FIG. 1. The first input shaft 11 and second input shaft 12 are each driveably connected to an input, such as the crankshaft of an engine or another drive shaft (not shown), via a first clutch 14 and a second clutch 15, respectively. The first input shaft 11 is engageable with the output shaft 13 through at least one of first pairs of gear wheels 16, and the second input shaft 12 is engageable with the output shaft 13 through at least one of second pairs of gear wheels 17. The first output shaft 11 is engageable with the output shaft 13 via three pairs of gear wheels 16 for the first, third and fifth speeds, and the second input shaft 12 is engageable with the output shaft 13 via three pairs of gear wheels 17 for the second, fourth and sixth speeds. In addition, the automated gear transmission 10 according to the invention includes a separate auxiliary shaft 18 to provide for reverse drive speed.

Referring again in particular to the illustration in FIG. 1 of the drawings, the transmission 10 transmits torque to the auxiliary shaft 18. A gear wheel 19, provided on the separate auxiliary shaft 18 for implementing reverse drive, is engageable with a gear wheel 20 on the second input shaft 12. Gear wheel 20 is a member of a second gear pair. A planetary gear set 21 is arranged on the auxiliary shaft 18 to reverse the direction of rotation for the reverse speed. The ring gear 22 of the planetary gear set 21 transmits torque to the output shaft 13 through its engagement with a gear wheel 23, which is mounted on the first input shaft 11. The reverse speed is engaged via a planet carrier 24 of the planetary gear set 21. Thus, the transmission 10 integrates the reverse speed such that all overlap of the individual speed-change gears is eliminated. Since the reverse gear wheel is in mesh only with the input shafts 11, 12, this reverse gear wheel can be positioned around the input shafts 11, 12 at an angle of approximately 180°. Only a single shaft distance between the reverse gear and the input shaft co-determines the transmission ratio of the two reverse gear wheels, which preferably mesh with the fixed gear for the third and fourth speeds. This arrangement also has the particular advantage of reducing interdependencies among the gear ratio, shaft distance, and pitch circle radii.

The gear wheel 19 is secured to the auxiliary shaft 18 and is engaged with the gear wheel 20 on the second input shaft 12. Preferably, gear wheel 20 is the gear wheel for the fourth speed. Thus, the torque for moving the vehicle in reverse is transmitted via the fourth speed gear wheel on the second input shaft to the fixed reverse speed gear wheel 19 on the auxiliary shaft 18. Alternatively, the gear wheel 20 on the input shaft 12 is the gear wheel for the sixth speed. A reversal of the sense of rotation and the necessary gear ratio reduction are then achieved via the planetary gear set 21 on the auxiliary shaft 18.

Moreover, in the embodiment of the automated gear transmission 10 according to the invention illustrated in the drawings, the gear wheel 23 mounted on the first input shaft 11 for engagement with the outer ring gear 22 of the planetary gear set 21 for torque transmission to the output shaft 13 is the third speed gear. Thus, torque is transmitted to the output shaft via the ring gear 22 and via the third speed gear 23 on the input shaft 11 when the third gear is engaged. In this condition, with the clutch disengaged, the third speed gear 23 on the input shaft 11 becomes an idler gear serving to transmit torque for the reverse speed. For this to take place, third gear must be engaged so that the torque can be transmitted.

In an alternative solution for the automated gear transmission 10 according to the invention, the gear wheel 23 mounted on the first input shaft 11 for engagement with the ring gear 22 of the planetary gear set 21 is the fifth speed gear.

Thus, as mentioned above, in the illustrated embodiment of the automated gear transmission 10 according to the invention, the gear wheel 23 mounted on the solid first input shaft 11 for engagement with the ring gear 22 of the planetary gear set 21 is an idler gear which serves to transmit torque for the reverse speed.

Moreover, in the illustrated embodiment, the gear wheel 20 is secured to input shaft 12 for engagement with the gear wheel 19 on the auxiliary shaft 18. The gear wheel 23 is secured to input shaft 11 for engagement with the ring gear 22, and is designed as a fixed gear; although, when clutch 14 of the solid input shaft is disengaged, the fixed-type third speed gear 23 becomes an idler gear.

Figure 2:
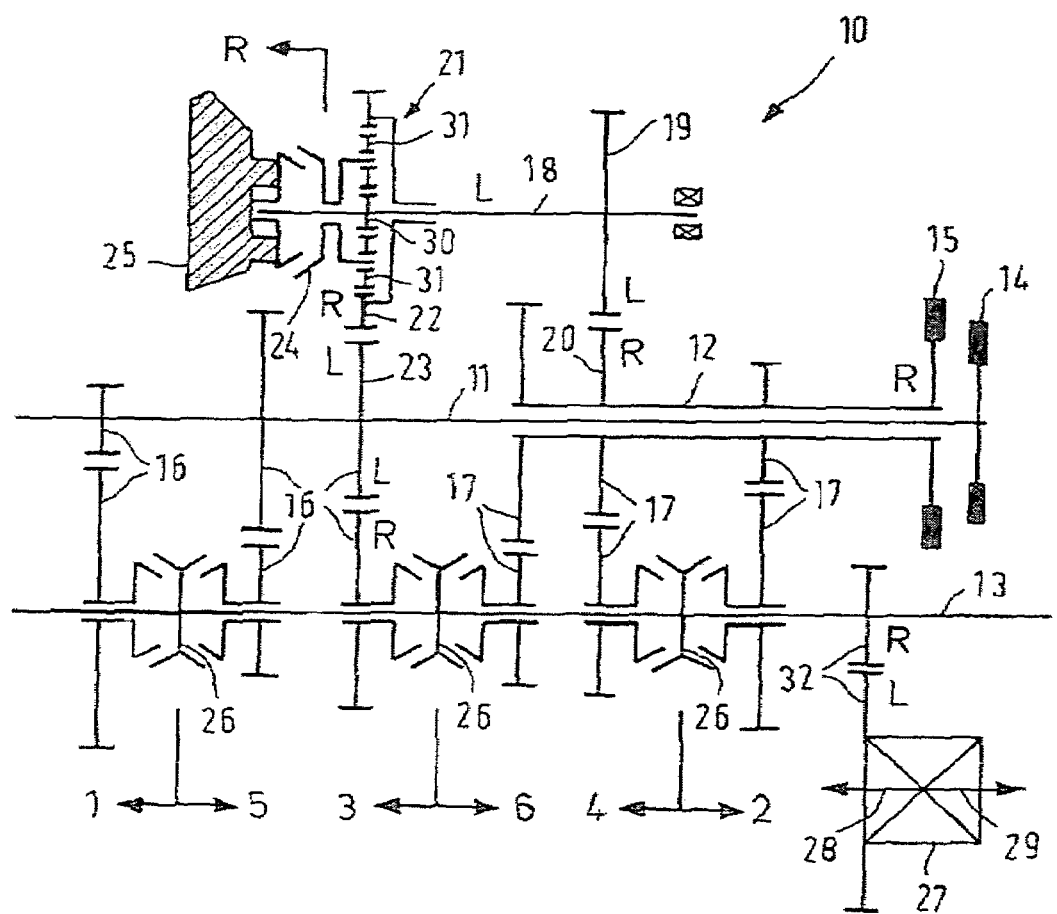
FIG. 2 is a view of the automated gear transmission of FIG. 1 showing the rotational directions of all gear wheels when the transmission produces reverse drive.

Shifting into reverse is achieved via the planet carrier 24 of the planetary gear set 21 by bringing planet carrier 24 into form-fitting, non-slip engagement with the housing 25, which is fixed against rotation. Thus, through the stationary planet carrier 24 of the planetary gear set 21, a reversal of the rotational direction of the auxiliary shaft 18 is achieved in a known manner via the sun gear 30 and the fixed planet gears 31, which, turning against the direction of the sun gear 30, act on the ring gear 22. Reference is made here in particular to FIG. 2, which shows the directions of rotation of the gears relevant for transmission of the reverse speed, with "L" denoting the counterclockwise direction and "R" the clockwise direction (viewed from the input toward the clutch) when the reverse speed is engaged. Thus, counterclockwise rotation of the auxiliary shaft 18 is converted, via the sun gear 30 of the planetary gear set 21, its planet carrier 24 (now stationary), and the fixed planet gears 31 turning against the direction of said sun gear 30, into clockwise rotation of the ring gear 22. The process of bringing the planet carrier 24 of the planetary gear set 21 into form-fitting, non-slip engagement with the housing 25 is preferably synchronized.

In order to achieve a particularly compact design, there is provided common sliding sleeve 26 on the synchronizers or couplers for the first and fifth speeds, for the third and sixth speeds, and for the fourth and second speeds, respectively. The common sliding sleeve selects engagement of the aforementioned speeds. These three sliding sleeves 26 on their respective couplers or synchronizers, are schematically illustrated in FIGS. 1 and 2 of the drawing. The slanted lines on these sleeves 26 indicating synchromesh engagement of the selected gear for each respective speed and the output shaft 13.

In addition to the foregoing, the ring gear 22 of the planetary gear set 21 has both internal and external teeth. The planetary gear set 21 provides a reversal of the rotational direction, in addition to the gear ratio reduction.

In FIG. 2, which indicates the directions of rotation of the gear wheels relevant to the transmission of the reverse speed, the second input shaft 12 and gear wheel 20 are shown to rotate clockwise. Gear wheel 20 meshes with the gear wheel 19 on the auxiliary shaft 18, which rotates in the opposite direction, i.e., counterclockwise. It follows that the auxiliary shaft 18 will also rotate in a counterclockwise direction, with the planetary gear set 21 producing a reversal of rotation with respect to its ring gear 22, which rotates clockwise. The ring gear 22 meshes with the gear wheel 23 on the first input shaft 11; therefore, gear wheel 23 rotates counterclockwise. Because gear wheel 23 is secured to the first input shaft 11 and functions as an idler gear when the clutch 14 of the solid input shaft is disengaged, the first input shaft 11 rotates counterclockwise with the gear wheel 23 when the reverse speed is engaged. The gear wheel 23 meshes with the mating third speed gear on the output shaft (which mating third speed gear is generally referred to by the numeral 16 herein), causing this mating gear to turn in the opposite direction, i.e., clockwise. It is therefore via this mating gear that the torque is transmitted to the output shaft 13 when the reverse speed is engaged. Further downstream, the direction of rotation of output shaft 13 is again reversed via a second pair of gear wheels 32 mounted, respectively, on the output shaft 13 and on a differential gear unit 27. The gear wheel arranged on the differential gear unit 27 of this gear wheel pair 32, will rotate counterclockwise. From the differential gear unit 27, the drive shafts 28 and 29 extend to the driving wheels of the vehicle.

The three gear wheels 16 on the first input shaft 11 each mesh in a known manner with the corresponding mating gear wheels 16 for the first, third and fifth speed, and the three gear wheels 17 on the second input shaft 12 each mesh in a known manner with the corresponding mating gear wheels 17 for the second, fourth and sixth speed on the output shaft 13.

Figure 3:
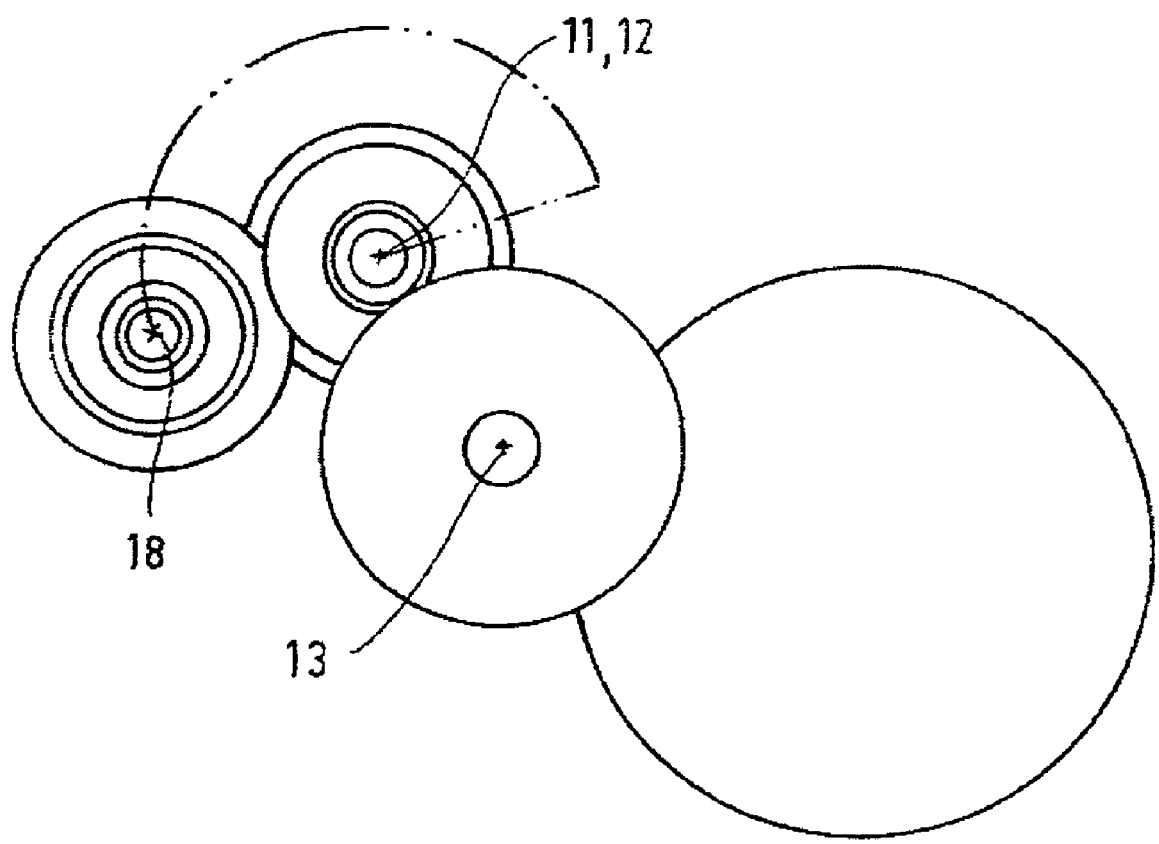
FIG. 3 is a side view of FIG. 4 showing the arrangement of the shafts and the pitch circles of the gear wheels.
Figure 4:
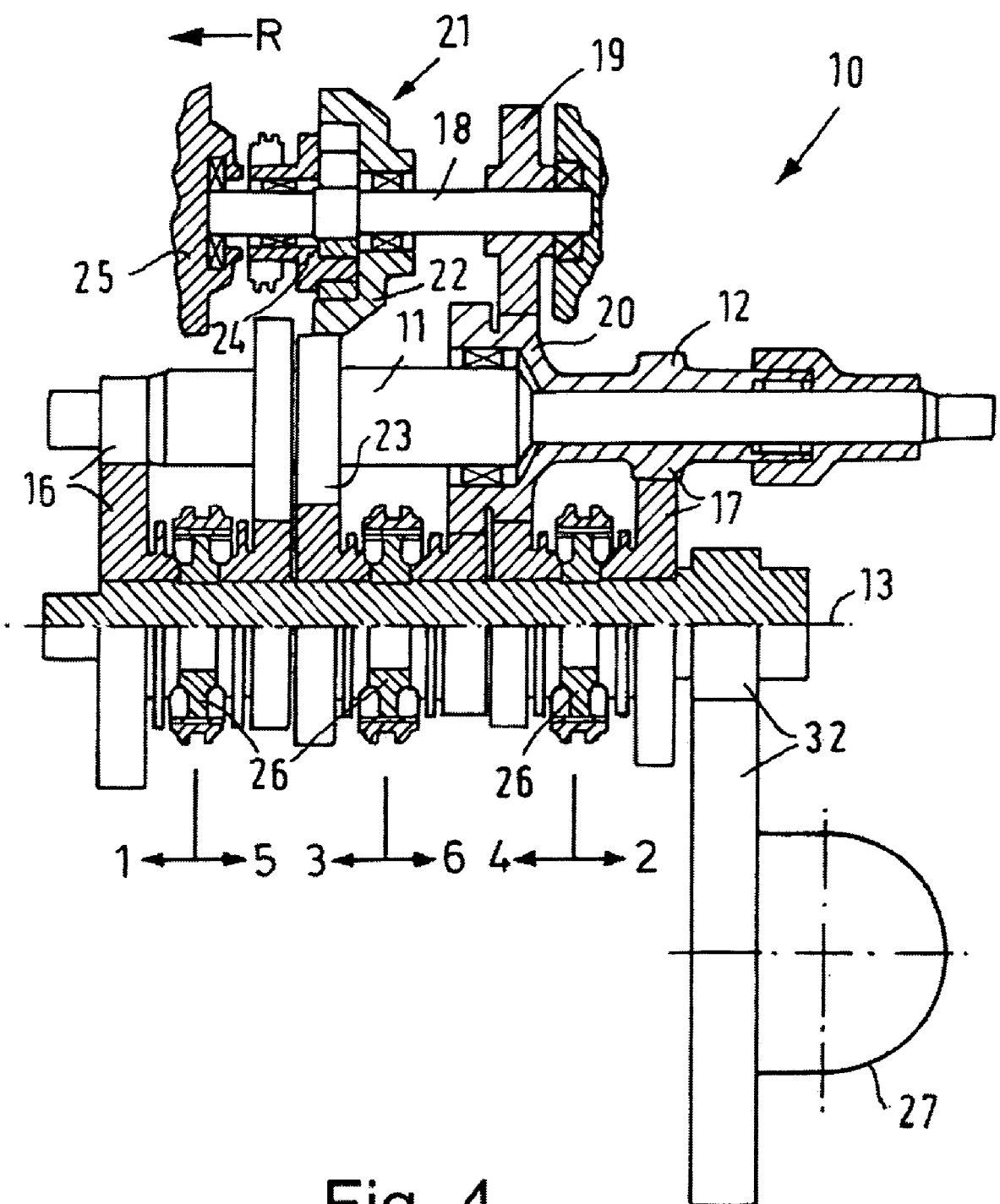
FIG. 4 is a schematic cross section of the automated gear transmission of FIGS. 2 and 3.

FIGS. 3 and 4 illustrate the transmission 10 in the form of a simplified schematic cross section showing the pitch circles of the gear wheels. Identified in FIG. 4 are the two input shafts 11, 12 with the three gear wheels 16 for the first, third and fifth speed, respectively, on the first input shaft 11; the three gear wheels 17 for the second, fourth and sixth speed, respectively, on the second input shaft 12; and the output shaft 13 carrying the corresponding three mating gears 16 for the first, third and fifth speed, respectively, and the three mating gears 17 for the second, fourth and sixth speed, respectively. Also identified are three sliding coupler sleeves 26 of the synchronizers or couplers on the output shaft 13, and the gear wheel pair 32 for transmitting the torque to the differential gear unit 27. Located above the two input shafts 11, 12, are the auxiliary shaft 18 for providing the reverse speed and carrying the gear wheel 19, which meshes with the fourth speed gear wheel 20 mounted on the second input shaft 12. The planetary gear set 21 is arranged on the auxiliary shaft 18 to reverse the rotational direction for the reverse speed, with the planet carrier 24 of said planetary gear set 21 being in form-fitting, non-slip engagement with the housing 25; and the ring gear 22 co-operating with the third speed gear wheel 23 on the first input shaft 11 so as to transmit the torque to the output shaft 13 when the reverse speed is engaged. The pitch circles in FIG. 4 illustrate specifically the arrangement of the individual input shafts 11, 12, the output shaft 13, and the auxiliary shaft 18 for the reverse speed, as well as the manner in which the individual gear wheels mesh. The pitch circles of these gear wheels have not been individually referenced with specific numerals for this purpose.

As mentioned above, the embodiments represented are merely given by way of example to illustrate the invention, which is not limited to these embodiments, but may be variously modified or otherwise expressed. Thus, the automated gear transmission according to the invention may, in particular, be of different structure and have a deviating number of speeds, e.g., five speeds or four speeds. Different arrangements of the input shafts 11, the output shaft 13, the gear wheels carried by any of these shafts, and the auxiliary shaft 18 with its planetary gear set 21 are likewise conceivable.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple speed transmission for a motor vehicle, comprising:
   a first input shaft;
   a second input shaft concentric with the first input shaft;
   an output shaft;
   an auxiliary shaft;
   a first clutch driveably connected to the first input shaft for driveably connecting and disconnecting the first input shaft;
   a second clutch driveably connected to the second input shaft for driveably connecting and disconnecting the second input shaft;
   first pairs of mutually engaged gears, a first member of each first pair being supported on the first input shaft, a second member of each first pair being supported on the output shaft;
   second pairs of mutually engaged gears, a first member of each second pair being supported on the second input shaft, a second member of each second pair being supported on the output shaft;
   a gear wheel supported on the auxiliary shaft and engaged with a gear of a second pair that is secured to the second input shaft;

a planetary gearset including a sun gear secured to the auxiliary shaft, a ring gear surrounding the sun gear, and planet pinions rotatably supported on a carrier and engaged with the ring gear and the sun gear, the ring gear being driveably engaged with a member of the first pair that is secured to the first input shaft; and a third clutch for alternately holding the carrier against rotation and releasing the carrier.

2. The transmission according to claim 1, wherein the gear wheel that is supported on the auxiliary shaft is secured to the auxiliary shaft.

3. The transmission according to claim 1, wherein a first gear of the second pair that is secured to the second input shaft transmits torque to the gear of the second pair with which said first gear is engaged when a fourth forward speed is produced by the transmission.

4. The transmission according to claim 1, wherein a first gear of the second pair that is secured to the second input shaft transmits torque to the gear of the second pair with which said first gear is engaged when a sixth forward speed is produced by the transmission.

5. The transmission according to claim 1, wherein a first gear of the first pair that is secured to the first input shaft transmits torque to a gear of the first pair with which said first gear is engaged when a third forward speed is produced by the transmission.

6. The transmission according to claim 1, wherein a first gear of the first pair that is secured to the first input shaft transmits torque to a gear of the first pair with which said first gear is engaged when a fifth forward speed is produced by the transmission.

7. The transmission according to claim 5, wherein a first gear of the first pair that is secured to the first input shaft functions as an idler gear when a reverse speed is produced by the transmission.

8. The transmission according to claim 6, wherein a first gear of the first pair that is secured to the first input shaft functions as an idler gear when a reverse speed is produced by the transmission.

9. The transmission according to claim 3, wherein the gear of a second pair that is supported on the second input shaft and engaged with the gear wheel is secured to the second input shaft.

10. The transmission according to claim 4, wherein the gear of a second pair that supported on the second input shaft and engaged with the gear wheel is secured to the second input shaft.

11. The transmission according to any of claim 5, wherein the gear of a second pair that is supported on the first input shaft and is engaged with the ring gear is secured to the first input shaft.

12. The transmission according to any of claim 7, wherein the gear of a second pair that is supported on the first input shaft and is engaged with the ring gear is secured to the first input shaft.

13. The transmission according to claim 1, further comprising a housing fixed against rotation, and wherein the third clutch engages the housing when reverse speed is produced by the transmission, and the third clutch releases the housing when the forward speeds are produced by the transmission.

14. The transmission according to claim 13, wherein engagement of the carrier and the housing is a synchronized engagement.

15. The transmission according to claim 1, further comprising:
first couplers secured to the output shaft, each first coupler including a displaceable sleeve for driveably connecting alternately a member of the first pairs to the output shaft; and
second couplers secured to the output shaft, each second coupler including a displaceable sleeve for driveably connecting alternately a member of the second pairs to the output shaft, thereby alternately selecting forward speeds to be produced by the transmission.

16. The transmission according to any of claim 1, wherein the ring gear has internal teeth engaged with the planet pinions, and external teeth engaged with a member of a first pair that is supported on the first input shaft.

17. The transmission according to claim 1, wherein the first input shaft is a solid shaft, and the second input shaft is a hallow sleeve shaft that surrounds the first input shaft over a portion of a length of the first input shaft.

18. A multiple speed transmission for a motor vehicle, comprising:
a first input shaft;
a second input shaft concentric with the first input shaft;
an output shaft;
an auxiliary shaft;
a first clutch driveably connected to the first input shaft for driveably connecting and disconnecting the first input shaft;
a second clutch driveably connected to the second input shaft for driveably connecting and disconnecting the second input shaft;
first pairs of mutually engaged gears, a first member of each first pair being secured to the first input shaft, a second member of each first pair being supported on the output shaft;
second pairs of mutually engaged gears, a first member of each second pair being secured to the second input shaft, a second member of each second pair being supported on the output shaft;
a gear wheel supported on the auxiliary shaft and engaged with a gear of a second pair that is secured to the second input shaft;
a planetary gearset including a sun gear secured to the auxiliary shaft, a ring gear surrounding the sun gear, and planet pinions rotatably supported on a carrier and engaged with the ring gear and the sun gear, the ring gear being driveably engaged with a member of the first pair that is secured to the first input shaft;
a third clutch for alternately holding the carrier against rotation and releasing the carrier;
first couplers secured to the output shaft, for driveably connecting to the output shaft a member of a first pair that is supported on the output shaft; and
second couplers secured to the output shaft, for driveably connecting to the output shaft a member of a second pair that is supported on the output shaft.

* * * * *